US006881782B2

(12) United States Patent
Crater et al.

(10) Patent No.: US 6,881,782 B2
(45) Date of Patent: Apr. 19, 2005

(54) LATEX PAINT COMPOSITIONS AND COATINGS

(75) Inventors: Davis H. Crater, Afton, MN (US); Jason T. Petrin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 171 days.

(21) Appl. No.: 10/288,887

(22) Filed: Nov. 6, 2002

(65) Prior Publication Data

US 2004/0087709 A1 May 6, 2004

(51) Int. Cl.$^7$ ............................. C08J 3/00; C08K 3/20; C08L 75/00; C08F 8/30; C08F 283/04

(52) U.S. Cl. ...................... 524/591; 524/507; 524/839; 524/840; 525/123; 525/455

(58) Field of Search ................................. 524/507, 839, 524/840, 591; 525/123, 455

(56) References Cited

U.S. PATENT DOCUMENTS

| | | |
|---|---|---|
| 2,803,615 A | 8/1957 | Ahlbrecht et al. |
| 2,915,554 A | 12/1959 | Ahlbrecht et al. |
| 3,124,605 A | 3/1964 | Wagner |
| 3,787,351 A | 1/1974 | Olson |
| 3,822,228 A | 7/1974 | Petrella et al. |
| 3,891,591 A | 6/1975 | Chang et al. |
| 4,208,496 A | 6/1980 | Bergfeld et al. |
| 4,600,441 A | 7/1986 | Goldberg et al. |
| 4,929,666 A | 5/1990 | Schmidt et al. |
| 5,006,624 A | 4/1991 | Schmidt et al. |
| 5,037,920 A | 8/1991 | Kriessmann et al. |
| 5,082,895 A | 1/1992 | Wolff et al. |
| 5,672,673 A | 9/1997 | Kirchmeyer et al. |
| 5,688,884 A | 11/1997 | Baker et al. |
| 5,827,919 A | 10/1998 | May |

FOREIGN PATENT DOCUMENTS

| | | |
|---|---|---|
| EP | 0 614 955 B1 | 5/1998 |
| WO | WO 97/12923 | 4/1997 |
| WO | WO 01/30873 A1 | 5/2001 |
| WO | WO 02/20676 A1 | 3/2002 |

OTHER PUBLICATIONS

"Surfactant Science Series", Amphoteric Surfactants, edited by Eric G. Lomax, (1996), vol. 59, 2$^{nd}$ Edition, Marcel Dekker, Inc., New York.
"Organofluorine Chemicals and Their Industrial Applications", edited by R. E. Banks, (1979), pp. 56–57, Ellis Horwood, Ltd., England.
3M Fluorad™ Fluorosurfactant FC–4430 Product Information 98–0212–2584–6 (Mar. 2002).
3M Fluorad™ Fluorosurfactant FC–4432 Product Information 98–0212–2586–1 (Mar. 2002).
DuPont™ Zonyl® Fluoroadditives for Coatings Technical Information P–200125.8 (Feb. 2001).

J. O. Hendricks, "Industrial Fluorochemicals", Industrial and Engineering Chemistry, (1953), pp. 99–105, vol. 45, No. 1.
K. A. Haagenson, "The Effect of Extender Particle Size on the Hiding Properties of an Interior Latex Flat Paint", American Paint & Coatings Journal, (Apr. 4, 1988), pp. 89–94.
M. K. Bernett et al., "Wetting of Low–Energy Solids by Aqueous Solutions of Highly Fluorinated Acids and Salts", Journal of Physical Chemistry, (Nov. 1959), pp. 1911–1916, vol. 63.
N. O. Brace, "Long Chain Alkanoic And Alkenoic Acids with Perfluoroalkyl Terminal Segments", Alkanoic Acids with Perfluoroalkyl Terminal Segments, (Dec. 1962), pp. 4491–4498, vol. 27.
Preparation, Properties, and Industrial Applications of Organofluorine Compounds, edited by R. E. Banks, (1982), p. 37, John Wiley & Sons, New York.
R. S. Hunter, "Chapter 8 Uniform Color Scales", The Measurement of Appearance, (1975), pp. 102–132, John Wiley & Sons, New York.
Technology of Paints, Varnishes and Lacquers, edited by C. R. Martens, (1968), pp. 515, Robert E. Krieger Publishing Co., Inc., Huntington, NY.
Behr, A Masco Company, C–PP–1850, Item No. 930400, Jul. 2002, 2002 Behr Process Corporation, Santa Ana, CA.
Bernett, et al., "Surface Properties of Perfluoro Acids as Affected by Terminal Branching and Chlorine Substitution", Journal of Physical Chemistry, (May–Aug. 1967), pp. 2075–2082, vol. 71.
H. C. Fielding, et al., "Organofluorine Surfactants and Textile Chemicals", Organofluorine Chemicals and their Industrial Applications, edited by R. E. Banks, (1979), Ellis Horwood, Ltd., England.
DuPont™ Zonyl® 8952 Latex Anti–Blocking Additive, P–200125.8 (Mar. 2001).
DuPont™ Zonyl® 8857A Anti–Block and Cleanability Additive, P–200125.8 (Mar. 2001).
DuPont™ Zonyl® 8867L, Latex Cleanability Additive and Oil Repellency, P–200125.8 (Mar. 2001).
U.S. Appl. No. 09/698,987, filed Oct. 27, 2000, Fluorochemical Sulfonamide Surfactants.
U.S. Appl. No. 10/183,176, filed Jun. 25, 2002, Latex Paint Compositions and Coatings.

*Primary Examiner*—Patrick D. Niland
(74) *Attorney, Agent, or Firm*—Lisa P. Fulton

(57) ABSTRACT

A latex paint composition comprises (a) a polymer having interpolymerized units that comprise units derived from styrene, methyl styrene, vinyl, or combinations thereof and units derived from one or more acrylates, methacrylates, acrylonitrile, or combinations thereof; (b) hiding pigment; (c) non-cellulosic thickener; and (d) a polyfluorourethane additive that is the reaction product of (i) at least one isocyanate reactant, (ii) at least one fluorochemical compound containing at least one Zerewitinoff hydrogen in an amount sufficient to react with about 5% to about 80% of the isocyanate groups, and (iii) at least one non-fluorinated compound; wherein said latex paint composition has a pigment volume concentration of at least 20% and less than its critical pigment volume concentration.

27 Claims, No Drawings

LATEX PAINT COMPOSITIONS AND COATINGS

FIELD

The present invention relates to latex paint compositions and coatings comprising fluorourethane additives and to methods for imparting improved stain and soil resistance to latex paints.

BACKGROUND

Latex paints are often preferred over solvent-based paints because of their improved safety, lower toxicity, and lower volatile-organic contents. Generally, however, latex paints, particularly flat latex paints, have poor stain and soil resistance. Because of their highly porous nature and rough surface texture, flat latex paints tend to absorb stains. Penetrating type stains, such as ink, soft drinks, wine, and other colored liquids, have easy access to the interior of a flat paint film through numerous pores and microchannels, and surface dirt, such as handprints, smudges, dust, and other particulate matter, can become entrapped in the bumpy, rough texture of the paint surface.

In recent years, flat latex paints having improved stain and soil resistance with resulting improved cleanability have been formulated (see, for example, EP 0 614 955). In addition, various additives, including hydrocarbon acrylic polymers and fluorine-containing compounds, have been used to impart improved stain and soil resistance to latex paints. Consumers, however, desire flat latex paints that can provide still better stain and soil resistance with resulting improved cleanability.

SUMMARY

In view of the foregoing, we recognize that there is a need to improve the stain and soil resistance of latex paints, particularly flat latex paints, without detracting from the other desirable properties of the paint such as, for example, improved safety and minimized environmental impact.

Briefly, in one aspect, the present invention provides latex paint compositions and coatings (as used herein, the term "coating" refers to the latex paint composition after it has been applied to a substrate and has dried) that have improved stain and soil resistance with resulting improved cleanability. The compositions comprise a latex paint comprising (a) a polymer having interpolymerized units that comprise units derived from styrene, methyl styrene, vinyl, or combinations thereof and units derived from one or more acrylates, methacrylates, acrylonitrile, or combinations thereof; (b) hiding pigment; (c) non-cellulosic thickener; and (d) a polyfluorourethane additive that is the reaction product of (i) at least one isocyanate reactant selected from the group consisting of diisocyanates, polyisocyanates, or mixtures of polyisocyanates containing at least three isocyanate groups per molecule, (ii) at least one fluorochemical compound containing at least one Zerewitinoff hydrogen in an amount sufficient to react with about 5% to about 80% of the isocyanate groups in the diisocyanate, and (iii) at least one non-fluorinated compound represented by the formula $R_{10}$—$(R_2)_k$—YH in an amount sufficient to react with about 5% to about 80% of the isocyanate groups in the diisocyanate or polyisocyanate wherein $R_{10}$ is a $C_1$–$C_{18}$ alkyl, $C_2$–$C_{18}$ omega-alkenyl, or $C_2$–$C_{18}$ omega-alkenoyl; $R_2$ is —$C_nH_{2n}$— optionally end-capped by —$[OCH_2C(R_4)H]_p$—, —$[OCH_2C(CH_2Cl)H]_p$—, or —$C(R_5)(R_6)(OCH_2C[CH_2Cl$ H$)]_p$— wherein $R_4$, $R_5$, and $R_6$ are each independently H or a $C_1$–$C_6$ alkyl, n is 0 to about 12, p is 1 to about 50; Y is O, S, or N($R_7$) wherein $R_7$ is H or $C_1$–$C_6$ alkyl; and k is 0 or 1; wherein the latex paint composition has a pigment volume concentration of at least 20% and less than its critical pigment volume concentration.

It has been discovered that the polyfluorourethane additives described herein impart improved stain and soil resistance and repellency into the latex paint composition of the invention even at relatively low concentrations. Thus, the compositions of the invention meet the need in the art for latex paints having improved stain and soil resistance while maintaining the other desirable properties of the paint.

In other aspects, this invention also provides articles with at least one surface of the article coated with the latex paint compositions of the invention, and methods of imparting stain resistance to a latex paint. The methods comprise the steps of (a) providing a latex paint composition comprising (1) a polymer having interpolymerized units that comprise units derived from styrene, methyl styrene, vinyl, or combinations thereof and units derived from one or more acrylates, methacrylates, acrylonitrile, or combinations thereof, (2) hiding pigment, and (3) non-cellulosic thickener; wherein the latex paint composition has a pigment volume concentration of at least 20% and less than its critical pigment volume concentration; (b) adding to the latex paint composition a polyfluorourethane additive that is the reaction product of (1) at least one isocyanate reactant selected from the group consisting of diisocyanates, polyisocyanates, or mixtures of polyisocyanates containing at least three isocyanate groups per molecule, (2) at least one fluorochemical compound containing at least one Zerewitinoff hydrogen in an amount sufficient to react with about 5% to about 80% of the isocyanate groups in the diisocyanate, and (3) at least one non-fluorinated compound represented by the formula $R_{10}$—$(R_2)_k$—YH in an amount sufficient to react with about 5% to about 80% of the isocyanate groups in the diisocyanate or polyisocyanate wherein $R_{10}$ is a $C_1$–$C_{18}$ alkyl, $C_2$–$C_{18}$ omega-alkenyl, or $C_2$–$C_{18}$ omega-alkenoyl; $R_2$ is —$C_nH_{2n}$— optionally end-capped by —$[OCH_2C(R_4)H]_p$—, —$[OCH_2C(CH_2Cl)H]_p$—, or —$C(R_5)(R_6)(OCH_2C[CH_2Cl]H)_p$— wherein $R_4$, $R_5$, and $R_6$ are each independently H or a $C_1$–$C_6$ alkyl, n is 0 to about 12, p is 1 to about 50; Y is O, S, or N($R_7$) wherein $R_7$ is H or $C_1$–$C_6$ alkyl; and k is 0 or 1; (c) applying the resulting composition of (b) to a substrate surface; and (d) allowing the resulting composition to dry such that a coating with a fluorine-enriched surface is formed on the substrate. As used herein, a "fluorine-enriched surface" refers to the surface of a coating that contains more fluorine at the surface than in the bulk.

DETAILED DESCRIPTION

Paint Composition

Binding Polymer

Polymers useful as component (a), the "binding polymer", of the latex paints of the invention are copolymerization products of a mixture of co-monomers which comprise monomers selected from styrene, methyl styrene, vinyl, or combinations thereof. Preferably co-monomers comprise (more preferably consist essentially of) at least 40 mole percent of monomers selected from styrene, methyl styrene, or combinations thereof and at least 10 mole percent of one or more monomers selected from the acrylates, methacrylates, and acrylonitrile. Preferably, the acrylates and methacrylates contain from 4 to 16 carbon atoms such as, for example, 2-ethylhexyl acrylate and methyl methacrylates. It is also preferable that the monomers be used in a proportion such that the final polymer has a glass-transition temperature (Tg) greater than 21° C. and less than 95° C. The polymers preferably have a weight-average molecular weight of at least 100,000.

Preferably, the binding polymer comprises interpolymerized units derived from 2-ethylhexyl acrylate. More preferably, the binding polymer comprises polymerized units comprising from 50 to 70 mole percent of units derived from styrene, methyl styrene, or combinations thereof; from 10 to 30 mole percent of units derived from 2-ethylhexyl acrylate; and from 10 to 30 mole percent of units derived from methyl acrylate, acrylonitrile, or combinations thereof.

Illustrative examples of suitable binding polymers include a copolymer whose interpolymerized units are derived from about 49 mole percent styrene, 11 mole percent α-methylstyrene, 22 mole percent 2-ethylhexyl acrylate, and 18 mole percent methyl methacrylates with a Tg of approximately 45° C. (available as Neocryl™ XA-6037 polymer emulsion from ICI Americas, Inc., Bridgewater, N.J.); a copolymer whose interpolymerized units are derived from about 51 mole percent styrene, 12 mole percent α-methylstyrene, 17 mole percent 2-ethylhexyl acrylate, and 19 mole percent methyl methacrylates with a Tg of approximately 44° C. (available as Joncryl™ 537 polymer emulsion from S.C. Johnson & Sons, Racine, Wis.); and a terpolymer whose interpolymerized units are derived from about 54 mole percent styrene, 23 mole percent 2-ethylhexyl acrylate, and 23 mole percent acrylonitrile with a Tg of approximately 44° C. (available as Carboset™ XPD-1468 polymer emulsion from B.F. Goodrich Co.). Preferably, the binding polymer is Joncryl™ 537.

Hiding Pigment

The latex paint of the invention comprises a hiding pigment to give the paints better "hiding power" or coverage. Preferably, the hiding pigment has a refractive index above about 1.8.

Suitable hiding pigments include white opacifying hiding pigments and colored organic and inorganic pigments. Representative examples of suitable white opacifying hiding pigments include rutile and anatase titanium dioxides, lithopone, zinc sulfide, lead titanate, antimony oxide, zirconium oxide, barium sulfide, white lead, zinc oxide, leaded zinc oxide, and the like, and mixtures thereof. A preferred white organic hiding pigment is rutile titanium dioxide. More preferred is rutile titanium dioxide having an average particle size between about 0.2 to 0.4 microns. Examples of colored organic pigments are phthalo blue and hansa yellow. Examples of colored inorganic pigments are red iron oxide, brown oxide, ochres, and umbers.

Thickener

Most known latex paints contain thickeners to modify the rheological properties of the paint to ensure good spreading, handling, and application characteristics. The latex paint of the invention comprises a non-cellulosic thickener (preferably, an associative thickener; more preferably, a urethane associative thickener).

Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Representative examples of suitable associative thickeners include polyacrylic acids (available, for example, from Rohm & Haas Co., Philadelphia, Pa., as Acrysol™ RM-825 and QR-708 Rheology Modifier) and activated attapulgite (available from Engelhard, Iselin, N.J. as Attagel™ 40).

Polyfluorourethane Additive

The latex paint of the invention comprises a polyfluorourethane additive, which imparts improved stain and soil resistance to the latex paint composition of the invention. The polyfluorourethane additives of the invention can be prepared by reacting (1) an isocyanate reactant, (2) a fluorochemical reactant, and (3) a non-fluorinated reactant.

The isocyanate reactant can be one or more diisocyanates or polyisocyanates or a mixture of polyisocyanates containing at least three isocyanate groups per molecule.

For example, hexamethylene diisocyanate homopolymers having the following formula:

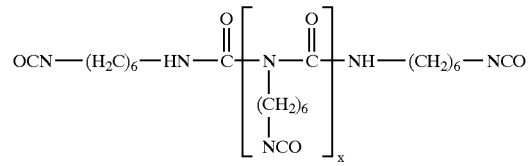

wherein x is an integer equal to or greater than 1 (preferably between 1 and about 8) are suitable for use as the isocyanate reactant.

Also suitable, for example, are hydrocarbon diisocyanate-derived isocyanate trimers, which can be represented by the following formula:

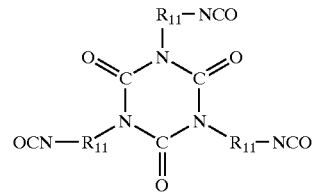

wherein $R_{11}$ is a divalent hydrocarbon group (preferably aliphatic, alicyclic, aromatic, or arylaliphatic) such as, for example, hexamethylene, toluene, or cyclohexylene (most preferably hexamethylene).

Other polyisocyanates useful in preparing the polyfluorourethane additives of the invention include those obtained by reacting three moles of toluene diisocyanate with 1,1,1-tris-(hydroxymethyl)ethane or 1,1,1-tris-(hydroxymethyl) propane, the isocyanurate trimer of toluene diisocyanate and that of 3-isocyanatomethyl-3,4,4-trimethylcyclohexyl isocyanate, methine-tris-(phenylisocyanate), and

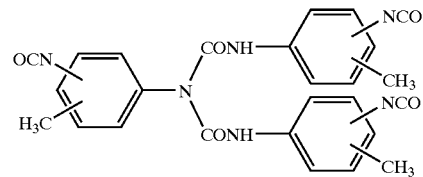

Suitable commercially available diisocyanates include Desmodur™ H (1,6-hexamethylene diisocyanate, HMDI), Desmodur™ W (bis[4-isocyanatocyclohexyl]methane, PICM), Mondur™ TD (a mixture of 2,4-diisocyanato-1-methylbenzene and 1,3-diisocyanato-2-methylbenzene, TDI), Mondur™ M (4,4'-diisocyanatodiphenylmethane, MDI), and isophorone diisocyanate (5-isocyanato-1-(isocyanatomethyl)-1,3,3-trimethyl-cyclohexane, IPDI) each available from Aldrich Chemical Co., Milwaukee, Wis.

Suitable commercially available extended diisocyanates include Desmodur™ 3200 and Desmodur™ N-100

(hexamethylene diisocyanate homopolymers) available from Bayer Corporation, Pittsburgh, Pa. Also suitable are Desmodur™ 3300 (a hexamethylene derived isocyanurate trimer) and Cythane™ 3160 (a glycerol based isocyanate available from American Cyanamid, Stamford, Conn.).

Fluorochemical reactants useful in preparing the polyfluorourethane additives of the invention contain one or more Zerewitinoff hydrogens, which react with the isocyanate groups to form urethanes. As used herein, a "Zerewitinoff hydrogen" is an active hydrogen that will react with a methyl magnesium halide (Grignard reagent) to liberate methane. The reaction is quantifiable by the method of Zerewitinoff et al. (see, for example, Th. Zerevitinov (Zerewitinoff), Ber. 40, 2023 (1907)), wherein an organic compound containing active hydrogen such as, for example, —OH, —COOH, and the like is reacted with a methyl magnesium halide to liberate methane. Volumetric measurement of the methane permits a quantitative estimate of the active hydrogen content of the compound. For purposes of this invention, it is assumed that a primary amine provides one active hydrogen as defined by Zerewitinoff et al.

The fluorochemical reactant is generally present in an amount sufficient to react with about 5% to about 80% of the diisocyanate. Preferably, when the polyfluorourethane additive is prepared using one or more polyisocyanates or a mixture of polyisocyanates containing at least three isocyanate groups per molecule, the fluorochemical compound is present in an amount sufficient to react with about 5% to about 33% of the isocyanate groups.

A wide variety of fluorochemical compounds can be used as the fluorochemical reactant in preparing the polyfluorourethane additives of the invention. The fluorochemical compounds contain at least two carbon atoms and each carbon atom contains at least two fluorine atoms. For example, the fluorochemical compound can be represented by the following general formula:

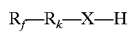

wherein $R_f$ is a monovalent aliphatic group containing at least two carbon atoms each of which contains at least two fluorine atoms;

R is a divalent organic radical;

k is 0 or 1; and

X is O, S, or $N(R_1)$ where $R_1$ is H, a $C_1$–$C_6$ alkyl or a $R_f$–$R_k$ group.

Preferably, the fluorochemical compound, which contains a single functional group, can be represented by the following general formula:

wherein $R_f$ and k are as defined above;

R is a divalent radical —$C_mH_{2m}$SO—, —$C_mH_{2m}$SO$_2$—, —SO$_2$N($R_3$)—, or —CON($R_3$) where m is 1 to about 22 and $R_3$ is H or a divalent $C_1$–$C_6$ alkyl group;

$R_2$ is a divalent linear hydrocarbon radical —$C_nH_{2n}$—, which is optionally end-capped with

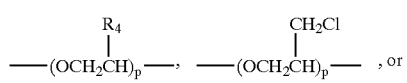

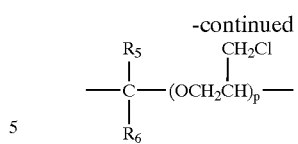

where n is 0 to about 12 and p is 1 to about 50;

$R_4$, $R_5$, and $R_6$ are each independently H or a $C_1$–$C_6$ alkyl;

X is O, S, or $N(R_7)$ where $R_7$ is H, a $C_1$–$C_6$ alkyl, or a $R_f$—$R_k$—$R_2$ group.

More preferably, $R_f$ is a fully fluorinated straight or branched aliphatic radical of about 3 to about 20 carbon atoms (which can be interrupted by oxygen atoms).

In a preferred embodiment, the fluorochemical compound can be represented by the following general formula:

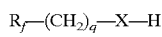

wherein

X is O, S, or $N(R_7)$ where $R_7$ is H, a $C_1$–$C_6$ alkyl or a $R_f$—$R_k$—$R_2$ group, $R_f$ is a mixture of perfluoroalkyl groups, $CF_3CF_2(CF_2)_r$ where r is 2 to about 18; and q is 1, 2, or 3.

In a more particular embodiment, $R_f$ is a mixture of said perfluoroalkyl groups, $CF_3CF_2(CF_2)_r$ and r is 2, 4, 6, 8, 10, 12, 14, 16, and 18. Preferably, r is predominately 4, 6, and 8 or r is predominately 6 and 8.

Representative fluoroaliphatic alcohols that can be used for the purposes of this invention include $C_sF(2_{s+1})(CH_2)_t$—OH, $(CF_3)_2CFO(CF_2CF_2)_uCH_2CH_2OH$, $C_sF(2_s+1)CON(R_a)$—$(CH_2)_t$—OH, and

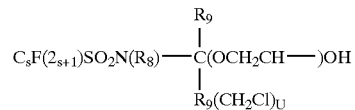

wherein s is 3 to about 14, t is 1 to about 12, u is 1 to about 5; each $R_8$ and $R_9$ is H or a $C_1$–$C_6$ alkyl.

In another embodiment, the fluorochemical compound can be represented by the general formula:

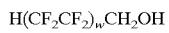

wherein w is 1 to about 10. This compound can be prepared by reacting tetrafluoroethylene with methanol. Another such compound is 1,1,1,2,2,2-hexafluoroisopropanol ($CF_3(CF_3)$CHOH).

Suitable fluorinated alcohols with the structure $R_fCH_2CH_2OH$ where $R_f$ is a $C_2$–$C_{20}$ perfluorocarbon include, for example, perfluoroalkyl ethanols available commercially as Zonyl™ BA and BA-N Fluorotelomer Intermediate from DuPont, Wilmington, Del. Zonyl™ BA and BA-N contain alpha-fluoro-omega-(2-hydroxyethyl)-poly (difluoromethylene) in the form of a mixture of the components of the homologous series of the formula:

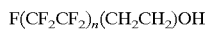

where for n=2, BA contains 1%–2%, BA-N contains <1%;

for n=3, BA contains 27%–34%, BA-N contains 3%–8%;

for n=4, BA contains 29%–34%, BA-N contains 45%–50%;

for n=5, BA contains 17%–21%, BA-N contains 28%–33%;

for n=6, BA contains 6%–9%, BA-N contains 8%–13%;
for n=7, BA contains 2%–5%, BA-N contains 1%–6%;
for n=8, BA contains 1%–2%, BA-N contains 1%–6%.

Also suitable are fluorinated thiols of the formula $R_fCH_2CH_2SH$ wherein $R_f$ is a $C_2$–$C_{20}$ perfluorocarbon such as, for example, Lodyne™ 924 (commercially available from Ciba-Geigy, Ardsley, N.Y.) and fluorinated sulfonamides of the formula $R_fSO_2N(R)CH_2CH_2OH$ wherein $R_f$ is a $C_2$–$C_{20}$ perfluoro group and R is hydrogen or a $C_1$–$C_8$ alkyl group such as, for example, Fluorad™ FC-10 (commercially available from 3M Company, St. Paul, Minn.).

In another embodiment, water-modified fluorochemical carbamates can be prepared by the sequential catalyzed reaction of Desmodur™ N-100, Desmodur™ N-3200, or Desmodur™ N-3300, or mixtures thereof (hexamethylene diisocyanate homopolymers available from Bayer Corporation, Pittsburgh, Pa.) with a stoichiometric deficiency of a perfluoroalkyl compound containing one functional group, then with a non-fluorinated reactant as described below, and then with water.

Non-fluorinated reactants useful in preparing the polyfluorourethane additives of the invention can be represented by the general formula:

$$R_{10}-(R_2)_k-YH$$

wherein
$R_{10}$ is a $C_1$–$C_{18}$ alkyl, $C_2$–$C_{18}$ omega-alkenyl, or $C_2$–$C_{18}$ omega-alkenoyl;
$R_2$ is 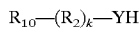 optionally end-capped by

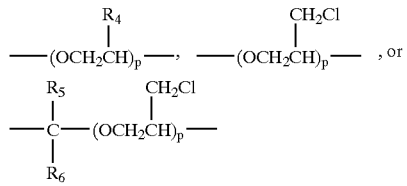

wherein $R_4$, $R_5$, and $R_6$ are each independently H or a $C_1$–$C_6$ alkyl, n is 0 to about 12, p is 1 to about 50; Y is O, S, or $N(R_7)$ wherein $R_7$ is H or $C_1$–$C_6$ alkyl; and
k is 0 or 1.

The non-fluorinated reactant is generally present in an amount sufficient to react with about 5% to about 80% of the isocyanate groups in the isocyante or polyisocyanate.

The non-fluorinated compound can be, for example, an alkanol or a monoalkyl or monoalkenyl ether or ester of a polyoxyalkylene glycol. Representative examples of such compounds include stearyl alcohol, the monomethyl ether of polyoxyethylene glycol, and the mono-allyl or -methallyl ether of polyoxyethylene glycol, and the mono-methacrylic or acrylic acid ester of polyoxyethylene glycol.

Optionally, water (generally in an amount sufficient to react with about 5% to about 60% (preferably about 5% to about 35%; more preferably about 10% to about 20%) of the isocyanate groups in the diisocyanate or polyisocyante) can be added when preparing the polyfluorourethane additives of the invention. The optional partial reaction of diisocyanates or polyisocyanates with water is often referred to as "extension of the diisocyanate" and the reaction product as an "extended diisocyanate". Procedures for extending diisocyanates are well known in the art (see, for example, U.S. Pat. No. 3,124,605 (Wagner)).

Usually between about 40% and about 95% (preferably, between about 60% and about 95%; more preferably, between about 80% and about 90%) of the isocyanate groups will have been reacted before water is optionally reacted with the diisocyanate or polyisocyanate.

The polyfluorourethane additives of the invention can be prepared, for example, by reacting, in the presence of a catalyst, an alkyl-terminated polyalkylene glycol, a flural-cohol or fluorothiol, and optionally an alcohol, thiol, or amine, with a diisocyanate or extended diisocyanate in a suitable solvent such as, for example, methylisobutylketone, methyl amyl ketone, methyl ethyl ketone, esters such as ethyl acetate, and aromatic solvents such as toluene or xylene. Suitable catalysts are well known to those skilled in the art. The catalyst can be, for example, a metal organic such as dibutyl tin dilaurate or tin octoate, or a tertiary amine such as trialkylamines, pyridine, ethyl morpholine, 1,4-diazabicyclo[2.2.2]octane (DABCO, Aldrich Chemical Co., Milwaukee, Wis.) or 1,8-diazabicyclo[5.4.0]undec-7-ene (DBU, Aldrich Chemical Co., Milwaukee, Wis.). The reaction product can be optionally further reacted with water to give a polyurethane in solvent. The polyurethane in solvent can be emulsified in water.

Emulsification typically occurs readily with mixing, but can be optionally facilitated by the use of homogenizing equipment and anionic surfactants (for example, alkyl sulfonates) or nonionic surfactants (for example, alcohol ethoxylates or alkylphenol ethoxylates) compatible with the latex paint composition. The solvent can be removed under reduced pressure to leave an aqueous dispersion.

The concentration of polyfluorourethane additive in the latex paint composition of the invention can vary. The use of relatively high concentrations will, at some point, become cost prohibitive. Relatively high concentrations can also, at some point, begin to interfere with the mechanical properties of the paint. Therefore, the polyfluorourethane additive is preferably present in an amount such that the paint composition has a scrub resistance, as defined by ASTM D2486-00 Standard Test Method for Scrub Resistance of Wall Paints, greater than 200 cycles. ASTM D2486-00 test method is a procedure for determining the resistance of wall paints to erosion caused by scrubbing. The number of scrub cycles to failure is the reported result. More preferably, the latex paint composition of the invention comprises between about 0.02 and about 2.5 weight percent polyfluorourethane additive. Most preferably, the latex paint composition of the invention comprises between about 0.03 and about 0.1 weight percent.

Other Ingredients

Latex-paint films are formed by coalescence of the binding polymer to form a binding matrix at the ambient paint application temperature to form a hard, tack-free film. Coalescing solvents aid the coalescence of the film-forming binder by lowering the film-forming temperature. The latex paints of the invention preferably contain a coalescing solvent. Representative examples of suitable coalescing solvents include 2-phenoxyethanol, diethylene glycol butyl ether, dibutyl phthalate, diethylene glycol, 2,2,4-trimethyl-1,1,3-pentanediol monoisobutyrate, and combinations thereof. Preferably, the coalescing solvent is diethylene glycol butyl ether (butyl carbitol)(available from Sigma-Aldrich, Milwaukee, Wis.) or 2,2,4-trimethyl-1,1,3-pentanediol monoisobutyrate (available from Eastman Chemical Co., Kingsport, Tenn., as Texanol™), or combinations thereof.

Coalescing solvent is preferably utilized at a level between about 12 to 60 grams (preferably about 40 grams) of coalescing solvent per liter of latex paint or at about 20 to 30 weight percent based on the weight of the polymer solids in the paint.

Paints can be manufactured to have a desired degree of gloss or shininess. Paint gloss is defined using ASTM Test Method D523 "Standard Test Method for Specular Gloss." Gloss ratings by this test method are obtained by comparing the reflectance from the specimen (at an angle of 20°, 60°, or 85° measured from the vertical) to that from a polished glass standard. Gloss readings at 20° describe the "depth" of gloss and are typically only used to describe gloss or semi-gloss paints. Gloss readings at 60° are used to describe most paints, except for completely flat paints. Gloss readings at 85° describe the "sheen" of flat, eggshell, and satin paints.

Typically, paints are categorized by their gloss values. For example, the Master Paint Institute (MPI) categorizes paints as follows:

| Type of Paint | 20° Gloss | 60° Gloss | 85° Gloss |
| --- | --- | --- | --- |
| Gloss | 20–90 | 70–85+ | — |
| Semi-gloss | 5–45 | 35–75 | — |
| Satin | — | 20–35 | min. 35 |
| Eggshell | — | 10–25 | 10–35 |
| Flat/matte | — | 0–10 | max. 35 |

The latex paints of the invention preferably have an 85° gloss less than or equal to about 20 and would therefore typically be considered eggshell or flat paints.

Flatter paints can be produced using various approaches. One approach is to increase the pigment volume concentration (that is, the ratio by volume of all pigments in the paint to total nonvolatiles)(PVC) of the paint above its critical pigment volume concentration (CPVC). At the CPVC, many physical and optical properties of paint change abruptly and the paint changes from a semi-gloss paint to a flat paint. Typically, though, high PVC flat paints exhibit less durability than lower PVC flat paints, all else being equal, because these flat paints have less binder available per unit of pigment.

Alternatively, a flat paint can be produced by adding a flatting agent (that is, a material which reduces the gloss of a paint film). Flatting agents introduce micro-roughness to the surface causing the light to be reflected in a diffuse manner, which reduces the apparent gloss. This latter approach generally produces a better paint film.

Therefore, the flat paints of the present invention have a PVC of at least 20% and less than their CPVC, but preferably contain a flatting agent. Preferably, the PVC is below about 54%; more preferably, below about 52%. Suitable flatting agents include silicas of various types such as, for example, Novacite™ Silica (available from Malvern Minerals, Hot Springs National Park, Ak.).

The paints of this invention can further comprise conventional materials used in paints such as, for example, plasticizer, anti-foam agent, pigment extender, pH adjuster, tinting color, and biocide. Such typical ingredients are listed, for example, in TECHNOLOGY OF PAINTS, VARNISHES AND LACQUERS, edited by C. R. Martens, R.E. Kreiger Publishing Co., p. 515 (1974).

Paints are commonly formulated with "functional extenders" to increase coverage, reduce cost, achieve durability, alter appearance, control rheology, and influence other desirable properties. Examples of functional extenders include, for example, barium sulphate, calcium carbonate, clay, gypsum, silica, and talc.

The most common functional extenders for interior flat paints are clays. Clays have a number of properties that make them desirable. Inexpensive calcined clays, for example, are useful in controlling low-shear viscosity and have a large internal surface area, which contributes to "dry hide". But, this surface area is also available to trap stains.

Because of their tendency to absorb stains, it is preferable that calcined clays are used in the paints of the invention only in the small amounts required for rheology control, for example, typically as less than about half of the total extender pigment, or are not used at all. The preferred extenders for use in the paints of the invention are calcium carbonates; most preferred are ultra-fine ground calcium carbonates such as, for example, Opacimite™ (available from ECC International, Sylacauga, Ala.), Supermite™ (available from Imerys, Roswell, Ga.), or others having particle size of approximately 1.0 to 1.2 microns. Ultra-fine calcium carbonate help to space titanium dioxide optimally for hide (see, for example, K. A. Haagenson, "The effect of extender particle size on the hiding properties of an interior latex flat paint," American Paint & Coatings Journal, Apr. 4, 1988, pp. 89–94).

Preparation of the Paint Composition

The latex paints of the invention can be prepared utilizing conventional techniques. For example, some of the paint ingredients are generally blended together under high shear to form a mixture commonly referred to as "the grind" by paint formulators. The consistency of this mixture is comparable to that of mud, which is desirable in order to efficiently disperse the ingredients with a high shear stirrer. During the preparation of the grind, high shear energy is used to break apart agglomerated pigment particles.

The ingredients not included in the grind are commonly referred to as "the letdown." The letdown is usually much less viscous than the grind, and is usually used to dilute the grind to obtain a final paint with the proper consistency. The final mixing of the grind with the letdown is typically carried out with low shear mixing.

Most polymer latexes are not shear stable, and therefore are not used as a component of the grind. Incorporation of shear unstable latexes in the grind can result in coagulation of the latex, yielding a lumpy paint with no, or little, film-forming capability. Consequently, paints are generally prepared by adding the latex polymer in the letdown.

However, the preferred paints of this invention contain latex polymers that are generally shear stable. Therefore, the latex paints of the invention can be prepared by incorporating some or all of the latex polymer into the grind. Preferably, at least some of the latex polymer is put in the grind.

Method of Imparting Stain and Soil Resistance

The fluorochemical acrylic polymer additives described above can be used to impart improved stain and soil resistance to latex paint compositions that have a pigment volume concentration of at least 20% and less than its critical pigment volume concentration and that comprise (a) a polymer having interpolymerized units that comprise units derived from styrene, methyl styrene, vinyl, or combinations thereof and units derived from one or more acrylates, methacrylates, acrylonitrile, or combinations thereof, (b) hiding pigment, and (c) noncellulosic thickener.

Preferably, the polymer's interpolymerized units comprise at least 10 mole percent of units derived from styrene, methyl styrene, or combinations thereof and at least 10 mole percent of units derived from one or more acrylates, methacrylates, acrylonitrile, or combinations thereof.

A latex paint coating with improved stain and soil resistance can be obtained by providing such a latex paint composition, adding a polyfluorourethane additive, applying the resulting composition to a substrate surface, and allowing the resulting composition to dry such that a coating with a fluorine-enriched surface is formed on the substrate surface. Preferably, the polyfluorourethane additive is added in an amount such that the paint composition has a scrub resistance, as defined by ASTM D2486-00 Standard Test Method for Scrub Resistance of Wall Paints, greater than 200 cycles. More preferably, between about 0.02 and about 2.5 weight percent polyfluorourethane additive is added to the latex paint composition. Most preferably, between about 0.03 and about 0.1 weight percent polyfluorourethane additive is added.

The polyfluorourethane additive can be added to the latex paint composition at any point during or after its formulation (for example, during the grind or the letdown or after all other ingredients have been blended). Preferably, the fluorochemical additive is added during the letdown.

The resulting latex paint composition can be applied to various substrate surfaces, such as, for example architectural surfaces such as walls and ceilings, articles such as furniture and boxes, or any other surface that is normally painted.

The resulting composition should be allowed to dry in a manner that allows the fluorochemical additive to migrate to the surface of the coating as it dries so that the resulting dried coating has a fluorine-enriched surface. Preferably, the composition is allowed to dry on the substrate surface under typical indoor temperature (about 10° C. (50° F.) to about 40° C. (100° F.)) and humidity (about 20% to about 90% relative humidity) conditions.

EXAMPLES

The invention will be further explained by the following illustrative examples, which are intended to be non-limiting. All percentages cited are by weight unless otherwise specified.

Glossary Table

| Descriptor | Description, Structure and/or Formula | Availability/ Preparation |
|---|---|---|
| Acrysol | ACRYSOL ™ RM-825; Thickener | Rohm and Haas Co., Philadelphia, PA |
| Attagel | ATTAGEL ™ 40; activated attapulgite | Engelhard, Iselin, NJ |
| Butyl Carbitol | diethylene glycol butyl ether | Sigma-Aldrich, Milwaukee, WI |
| Colortrend | Raw Umber 888–2009; Premixed with water (1:10) | Degussa, Philadelphia, PA |
| Drew | DREWPLUS ™ L-475 | Ashland Specialty Chemical Co., Dublin, OH |
| Joncryl | JONCRYL ™ 537 | Johnson Polymer, Inc., Sturtevant, WI |
| Novacite | NOVACITE ™ 1250; Silica | Malvern Minerals, Hot Springs National Park, AR |
| Nuosept | NUOSEPT ™ 95; Biocide | Degussa, Philadelphia, PA |
| Propylene Glycol | $CH_3CHOHCH_2OH$ | Sigma-Aldrich, Milwaukee, WI |
| Supermite | SUPERMITE ™; $CaCO_3$ | Imerys, Roswell, GA |
| Texanol | TEXANOL ™ ester alcohol | Eastman Chemical Company, Kingsport, TN |
| Ti-Pure | TI-PURE ™ titanium dioxide; R900 | DuPont, Wilmington, DE |
| Zonyl | ZONYL ™ 8867-L; Fluorochemical Urethane | DuPont, Wilmington, DE |

Coating Method and Testing
Coating Method for Stain Release Testing

The latex paint samples were prepared by coating a latex paint composition onto a black scrub test panel (Form P121-10N; 16.5 cm×43.2 cm; available from The Leneta Co., Mahwah, N.J.) using a hand coater with a 6 mil (0.15 mm) gap. The resulting latex paint coating was allowed to air dry at ambient temperature and humidity for 7 days.

Soiling/Cleaning Test Method

"Greasy dirt" was prepared by high shear mixing of 50 parts Lanolin (USP anhydrous), 50 parts Petrolatum, 5 parts carbon black, 30 parts stick margarine, and 10 parts mineral oil at 120° F. (50° C.) for about 15 minutes. The resulting greasy dirt was applied onto the painted test panel with a 3" (7.62 cm) paint roller and allowed to set for 18–24 hours. The resulting dirty panel was vigorously rubbed with a clean paper towel to remove as much of the greasy dirt as possible. The panel (painted side up) was then affixed to a Gardner Scrub Machine (available from Gardner Laboratories, Bethesda, Md.). A cellulosic sponge, saturated with 5% DAWN™ dishwashing liquid (available from Procter & Gamble, Cincinnati, Ohio) in deionized (DI) water and squeezed to remove the bulk of the dishwashing solution, was placed into the scrub machine brush holder. About 200 ml DAWN™ dishwashing liquid (5% in DI water) was applied to the painted and dirtied surface of the scrub test panel. The scrubbing was stopped after 17 double scrubs and the test panel was removed, rinsed with DI water, and air-dried for at least one hour.

Residual Stain Measurement

Residual stain measurements were taken using a Minolta CR200 Chroma meter (available from Minolta Corp, Osaka, Japan) with D65 illuminant. L*, a*, and b* measurements of the unstained portion of the scrub test panel (designated with subscript "u" in the formula below) and stained portion of the scrub test panel (designated with the subscript "s" in the formula below) were taken. To calculate the residual stain, ΔE, the following formula was used:

$$\Delta E = \sqrt{(L_u^* - L_s^*)^2 + (a_u^* - a_s^*)^2 + (b_u^* - b_s^*)^2}$$

This ΔE value represents the distance in the L*a*b* color space between the unstained area and the stained area (see, for example, Richard S. Hunter, THE MEASUREMENT OF APPEARANCE, Wiley-Interscience, pp. 102–130, (1975)). It is a good measurement for the difference in color as perceived by people. The smaller the ΔE value, the cleaner the surface.

Scrub Resistance Test Method

Scrub resistance was determined according to ASTM D2486-00 Standard Test Method for Scrub Resistance of Wall Paints using a Gardner Scrub Machine (available from Gardner Laboratories, Bethesda, Md.). The result reported is the number of scrub cycles at which the paint coating failed the test. Therefore the higher the cycle number, the more scrub resistant the paint coating.

Preparation of Latex Paint Compositions

A 1 L jacketed stainless steel beaker was charged with the grind: Joncryl (161.50 g), Propylene Glycol (31.45 g), Drew (2.55 g), Ti-Pure (170.00 g), Supermite (134.51 g), Novacite (75.23 g), and Attagel (8.50 g). Cooling water was then turned on and the resulting mixture was dispersed at high speed (11,000 rpm) using a high shear Cowles mixer equipped with a 32 mm Cowles impeller for about 30 minutes. The high shear Cowles mixer was then replaced with a low shear marine impeller mixer running at 200 rpm and the mixture was let down by adding the letdown: Joncryl (136.00 g), DI water (223.43 g), Drew (0.85 g), Acrysol (15.30 g), Texanol (25.73 g), Butyl Carbitol (9.37 g), Colortrend (4.56 g), and Nuosept (1.28 g).

Comparative Example C1

Comparative Example C1 was prepared following the Preparation of Latex Paint Compositions procedure and Coating Method and Testing procedures described above. Table 1 lists the ΔE value and scrub resistance for Comparative Example C1.

Comparative Example C2

Comparative Example C2 was prepared using Wal-Mart Colorplace™ (2140 Light Base) paint, available from Wal-Mart, Bentonville, Ark., which it is believed has a pigment volume concentration that exceeds the critical pigment volume concentration, in the Coating Method and Testing procedures described above. Table 1 lists ΔE values and scrub resistance for Comparative Example C2.

Comparative Examples C3–C5

Comparative Examples C3–C5 were prepared using Wal-Mart Colorplace™ (200 g.; 2140 Light Base) paint, available from Wal-Mart, which it is believed has a pigment volume concentration that exceeds the critical pigment volume concentration, in the Coating Method and Testing procedures described above. Zonyl was added using low shear mixing to the formulation at the amounts listed in Table 1. Table 1 also lists ΔE values and scrub resistance for Comparative Example C3–C5.

Comparative Example C6

Comparative Example C6 was prepared using Conco™ Interior Flat Latex Water Base Wall Paint, High Hide White paint, available from Smiland Paint Co., Los Angeles, Calif. which it is believed has a pigment volume concentration that exceeds the critical pigment volume concentration, in the Coating Method and Testing prodcedures described above. Table 1 lists ΔE values for Comparative Example C6.

Comparative Examples C7–C9

Comparative Examples C7–C9 were prepared using Conco™ Interior Flat Latex Water Base Wall Paint, High Hide White paint (200 g), available from Smiland Paint Co., in the Coating Method and Testing procedures described above. Zonyl was added to the paint at the amounts listed in Table 1. Table 1 also lists ΔE values for Comparative Examples C7–C9.

Examples 1–4

Examples 1 through 4 were prepared using aliquots of paint (200 g) as prepared in the general procedure for the Preparation of Latex Paint Compositions described above and adding the amounts of Zonyl listed in Table 1. The samples were prepared using the Coating Method and Testing procedures described above. Table 1 lists the ΔE values for Examples 1 through 4.

TABLE 1

| Example Number | % Zonyl | ΔE | Scrub Resistance (scrub cycles) |
|---|---|---|---|
| C1-1 | none | 12.06 | 400 |
| C1-2 | none | 14.61 | 400 |
| C2 | none | 29.15 | 200 |
| C3-1 | 0.5 | 20.27 | — |
| C3-2 | 0.5 | 10.05 | 180 |
| C4-1 | 3.0 | 5.07 | — |
| C4-2 | 3.0 | 5.37 | 160 |
| C5-1 | 7.0 | 2.58 | — |
| C5-2 | 7.0 | 2.45 | 105 |
| C6 | none | 22.34 | — |
| C7 | 0.10 | 25.07 | — |
| C8 | 0.30 | 20.11 | — |
| C9 | 0.50 | 23.03 | — |
| 1 | 0.01 | 9.36 | — |
| 2 | 0.03 | 7.91 | — |
| 3 | 0.05 | 4.21 | — |
| 4 | 0.08 | 0.97 | — |

The data in Table 1 shows that the comparative example paint compositions exhibit poor stain resistance (that is, low ΔE) unless a relatively high concentration of polyfluorourethane is present. But, at high concentrations, the scrub resistance of the paint coating deteriorates. The paint compositions of the invention, however, exhibit improved stain resistance (that is, high ΔE) at relatively low concentrations of polyfluorourethane.

What is claimed is:

1. A latex paint composition comprising
   (a) a polymer having interpolymerized units that comprise units derived from styrene, methyl styrene, vinyl, or combinations thereof and units derived from one or more acrylates, methacrylates, acrylonitrile, or combinations thereof;
   (b) hiding pigment;
   (c) non-cellulosic thickener; and
   (d) a polyfluorourethane additive that is the reaction product of:
      (i) at least one isocyanate reactant selected from the group consisting of diisocyanates, polyisocyanates, or mixtures of polyisocyanates containing at least three isocyanate groups per molecule,
      (ii) at least one fluorochemical compound containing at least one Zerewitinoff hydrogen in an amount sufficient to react with about 5% to about 80% of the isocyanate groups in said diisocyanate, and
      (iii) at least one non-fluorinated compound represented by the formula $R_{10}$—$(R_2)_k$—YH in an amount sufficient to react with about 5% to about 80% of the isocyanate groups in said diisocyanate or polyisocyanate wherein $R_{10}$ is a $C_1$–$C_{18}$ alkyl, $C_2$–$C_{18}$ omega-alkenyl, or $C_2$–$C_{18}$ omega-alkenoyl; $R_2$ is —$C_nH_{2n}$— optionally end-capped by —[$OCH_2C(R_4)H$]$_p$—, —[$OCH_2C(CH_2Cl)H$]$_p$—, or —$C(R_5)(R_6)(OCH_2C[CH_2Cl]H)_p$— wherein $R_4$, $R_5$, and $R_6$ are each independently H or a $C_1$–$C_6$ alkyl, n is 0 to about 12, p is 1 to about 50; Y is O, S, or $N(R_7)$ wherein $R_7$ is H or $C_1$–$C_6$ alkyl; and k is 0 or 1;
   wherein said latex paint composition has a pigment volume concentration of at least 20% and less than its critical pigment volume concentration.

2. The paint composition of claim 1 wherein said polyfluorourethane additive is present in an amount such that said paint composition has a scrub resistance, as defined by ASTM D2486-00 Standard Test Method for Scrub Resistance of Wall Paints, greater than 200 cycles.

3. The paint composition of claim 2 wherein said paint composition comprises between about 0.02 and about 2.5 weight percent of said polyfluorourethane additive.

4. The paint composition of claim 1 wherein said polyfluorourethane additive is the reaction product of said isocyanate reactant, said fluorochemical compound, said non-fluorinated compound, and water.

5. The paint composition of claim 1 wherein said isocyanate reactant is selected from the group consisting of polyisocyanates and mixtures of polyisocyanates containing at least three isocyanate groups per molecule and said non-fluorinated compound is in an amount sufficient to react with about 5% to about 33% of the isocyanate groups in said polyisocyanate.

6. The paint composition of claim 1 wherein said fluorochemical compound is represented by the following general formula:

$$R_fCH_2CH_2OH$$

wherein $R_f$ is a $C_2$–$C_{20}$ perfluorocarbon.

7. The paint composition of claim 1 wherein said interpolymerized units comprise at least 40 mole percent of units derived from styrene, methyl styrene, or combinations thereof and at least 10 mole percent of units derived from one or more acrylates, methacrylates, acrylonitrile, or combinations thereof.

8. The paint composition of claim 7 wherein said interpolymerized units comprise units derived from 2-ethylhexyl acrylate.

9. The paint composition of claim 8 wherein said interpolymerized units comprise from 50 to 70 mole percent of units derived from styrene, methyl styrene, or combinations thereof; from 10 to 30 mole percent of units derived from 2-ethylhexyl acrylate; and from 10 to 30 mole percent of units derived from methyl acrylate, acrylonitrile, or combinations thereof.

10. The paint composition of claim 7 wherein said interpolymerized units consist essentially of units derived from two or more monomers selected from the group consisting of styrene, methyl styrene, acrylates, methacrylates, and acrylonitrile.

11. The paint composition of claim 7 wherein said acrylates and methacrylates contain from about 4 to about 16 carbon atoms.

12. The paint composition of claim 1 wherein said polymer has a glass-transition temperature between 21° C. and 95° C.

13. The paint composition of claim 1 wherein said hiding pigment has an index of refraction above about 1.8.

14. The paint composition of claim 1 wherein thickener is an associative thickener.

15. The paint composition of claim 14 wherein said thickener is a polyurethane associative thickener.

16. The paint composition of claim 1 wherein said latex paint further comprises a flatting agent and has an 85° gloss of less than or equal to about 20.

17. The paint composition of claim 16 wherein said flatting agent is silica.

18. The paint composition of claim 1 wherein said latex paint has a pigment volume concentration of less than about 55%.

19. The paint composition of claim 1 wherein said latex paint further comprises a calcium carbonate functional extender.

20. The paint composition of claim 1 wherein said latex paint further comprises a coalescing solvent.

21. The paint composition of claim 20 wherein said coalescing solvent is butyldiglycol, 2,2,4-trimethyl-1,3-pentandiol-monoisobutyrate, or combinations thereof.

22. A latex paint composition comprising
   (a) a polymer having interpolymerized units that comprise units derived from styrene, methyl styrene, vinyl, or combinations thereof and units derived from one or more acrylates, methacrylates, acrylonitrile, or combinations thereof;
   (b) hiding pigment;
   (c) non-cellulosic thickener; and
   (d) a polyfluorourethane additive that is the reaction product of:
      (i) at least one isocyanate reactant selected from the group consisting of diisocyanates, polyisocyanates, or mixtures of polyisocyanates containing at least three isocyanate groups per molecule,
      (ii) at least one fluorochemical compound of the general formula:

$$R_fCH_2CH_2OH$$

Wherein $R_f$ is a $C_2$–$C_{20}$ perfluorocarbon, and
      (iii) at least one non-fluorinated compound represented by the formula $R_{10}$—$(R_2)_k$—YH in an amount sufficient to react with about 5% to about 80% of the isocyanate groups in said diisocyanate or polyisocyanate wherein $R_{10}$ is a $C_1$–$C_{18}$ alkyl, $C_2$–$C_{18}$ omega-alkenyl, or $C_2$–$C_{18}$ omega-alkenoyl; $R_2$ is —$C_nH_{2n}$— optionally end-capped by —[$OCH_2C(R_4)H$]$_p$—, —[$OCH_2C(CH_2Cl)H$]$_p$—, or —$C(R_5)(R_6)(OCH_2C[CH_2Cl]H)_p$— wherein $R_4$, $R_5$, and $R_6$ are each independently H or a $C_1$–$C_6$ alkyl, n is 0 to about 12, p is 1 to about 50; Y is O, S, or $N(R_7)$ wherein $R_7$ is H or $C_1$–$C_6$ alkyl; and k is 0 or 1;
   wherein said latex paint composition has a pigment volume concentration of at least 20% and less than its critical pigment volume concentration and said polyfluorourethane additive is present in an amount such that said paint composition has a scrub resistance, as defined by ASTM D2486-00 Standard Test Method for Scrub Resistance of Wall Paints, greater than 200 cycles.

23. An article wherein a portion of at least one surface of said article is coated with the paint composition of claim 1.

24. A method of imparting stain and soil resistance to a latex paint coating comprising the steps of
   (a) providing a latex paint composition comprising (1) a polymer having interpolymerized units that comprise units derived from styrene, methyl styrene, vinyl, or combinations thereof and units derived from one or more acrylates, methacrylates, acrylonitrile, or combinations thereof, (2) hiding pigment, and (3) non-cellulosic thickener; wherein said latex paint composition has a pigment volume concentration of at least 20% and less than its critical pigment volume concentration;
   (b) adding to said latex paint composition a polyfluorourethane additive that is the reaction product of (1) at least one isocyanate reactant selected from the group consisting of diisocyanates, polyisocyanates, or mixtures of polyisocyanates containing at least three isocyanate groups per molecule, (2) at least one fluorochemical compound containing at least one Zerewitinoff hydrogen in an amount sufficient to react with about 5% to about 80% of the isocyanate groups in said diisocyanate, and (3) at least one non-fluorinated compound represented by the formula $R_{10}$—$(R_2)_k$—YH in an amount sufficient to react with about 5% to about 80% of the isocyanate groups in said diisocyanate or polyisocyanate wherein $R_{10}$ is a $C_1$–$C_{18}$ alkyl, $C_2$–$C_{18}$ omega-alkenyl, or $C_2$–$C_{18}$ omega-alkenoyl; $R_2$ is —$C_nH_{2n}$— optionally end-capped by —[$OCH_2C(R_4)H$]$_p$—, —[$OCH_2C(CH_2Cl)H$]$_p$—, or —$C(R_5)(R_6)(OCH_2C[CH_2Cl]H)_p$— wherein $R_4$, $R_5$, and $R_6$ are each independently H or a $C_1$–$C_6$ alkyl, n is 0 to about 12, p is 1 to about 50; Y is O, S, or $N(R_7)$ wherein $R_7$ is H or $C_1$–$C_6$ alkyl; and k is 0 or 1;

(c) applying the resulting composition of (b) to a substrate surface; and (d) allowing said resulting composition to dry such that a coating with a fluorine-enriched surface is formed on said substrate.

25. The method claim 24 wherein to said latex paint composition said polyfluorourethane additive is added in an amount such that the resulting composition of (d) has a scrub resistance, as defined by ASTM D2486-00 Standard Test Method for Scrub Resistance of Wall Paints, greater than 200 cycles.

26. The method of claim 25 wherein to said latex paint composition between about 0.02 and about 2.5 weight percent if said polyfluorourethane additive is added.

27. The method of claim 24 wherein said polyfluorourethane additive is the reaction product of said isocyanate reactant, said fluorochemical compound, said non-fluorinated compound, and water.

* * * * *

UNITED STATES PATENT AND TRADEMARK OFFICE
CERTIFICATE OF CORRECTION

PATENT NO. : 6,881,782 B2
DATED : April 19, 2005
INVENTOR(S) : Crater, Davis H.

It is certified that error appears in the above-identified patent and that said Letters Patent is hereby corrected as shown below:

Column 6,
Line 32, delete "$CON(R_a)$" and insert -- $CON(R_8)$ --.

Column 9,
Line 50, delete "Ak." and insert -- AR --.

Signed and Sealed this

Thirty-first Day of January, 2006

JON W. DUDAS
*Director of the United States Patent and Trademark Office*